March 10, 1936. F. H. B. STELZER 2,033,310
MACHINE FOR MAKING CIGAR ROLLS
Filed July 17, 1934 12 Sheets-Sheet 6
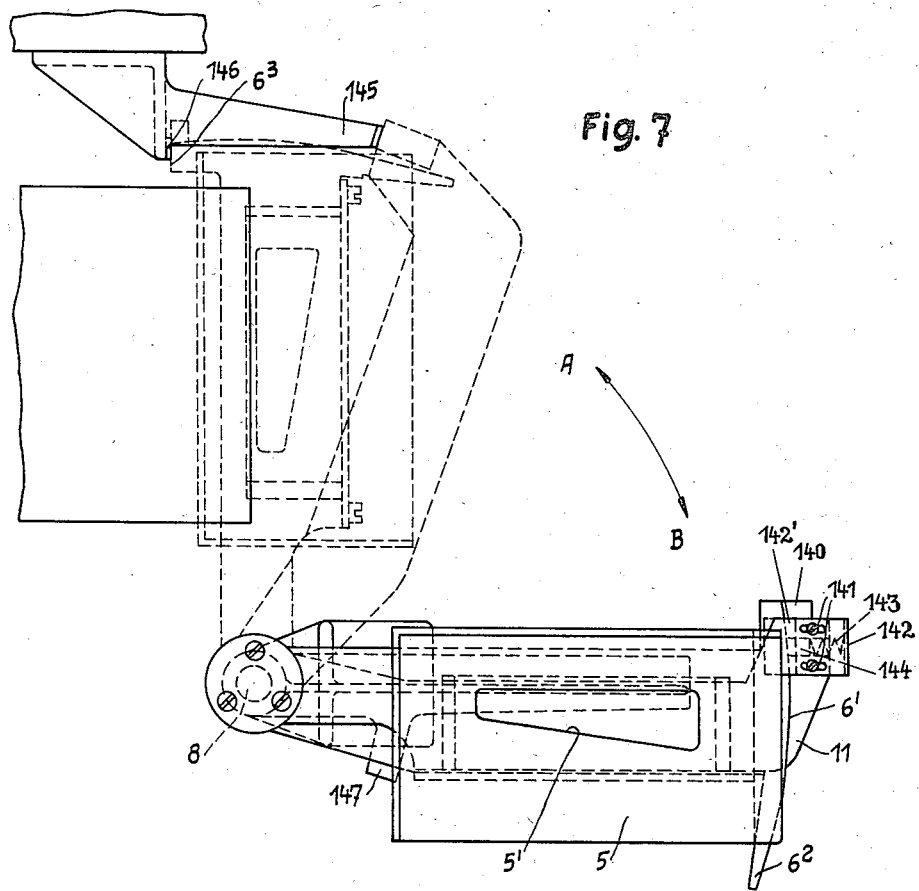
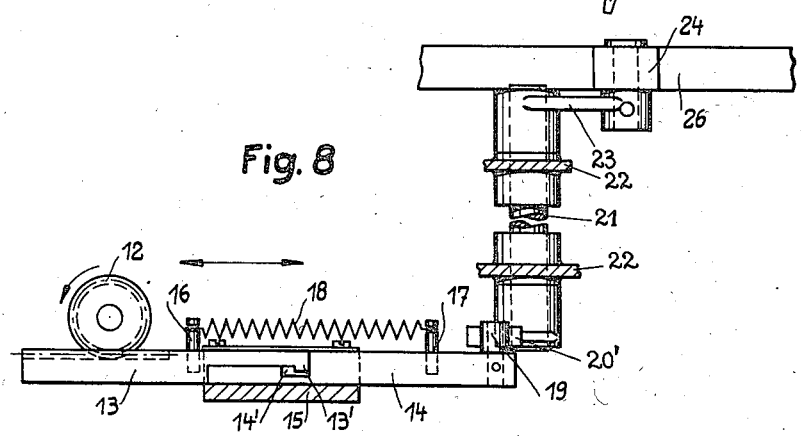
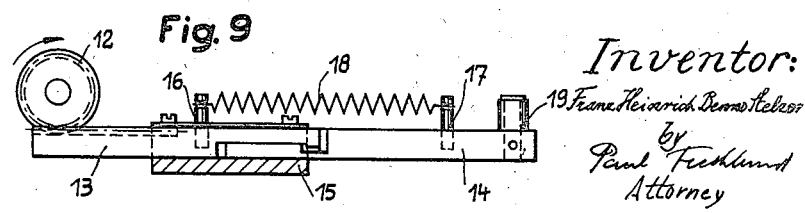

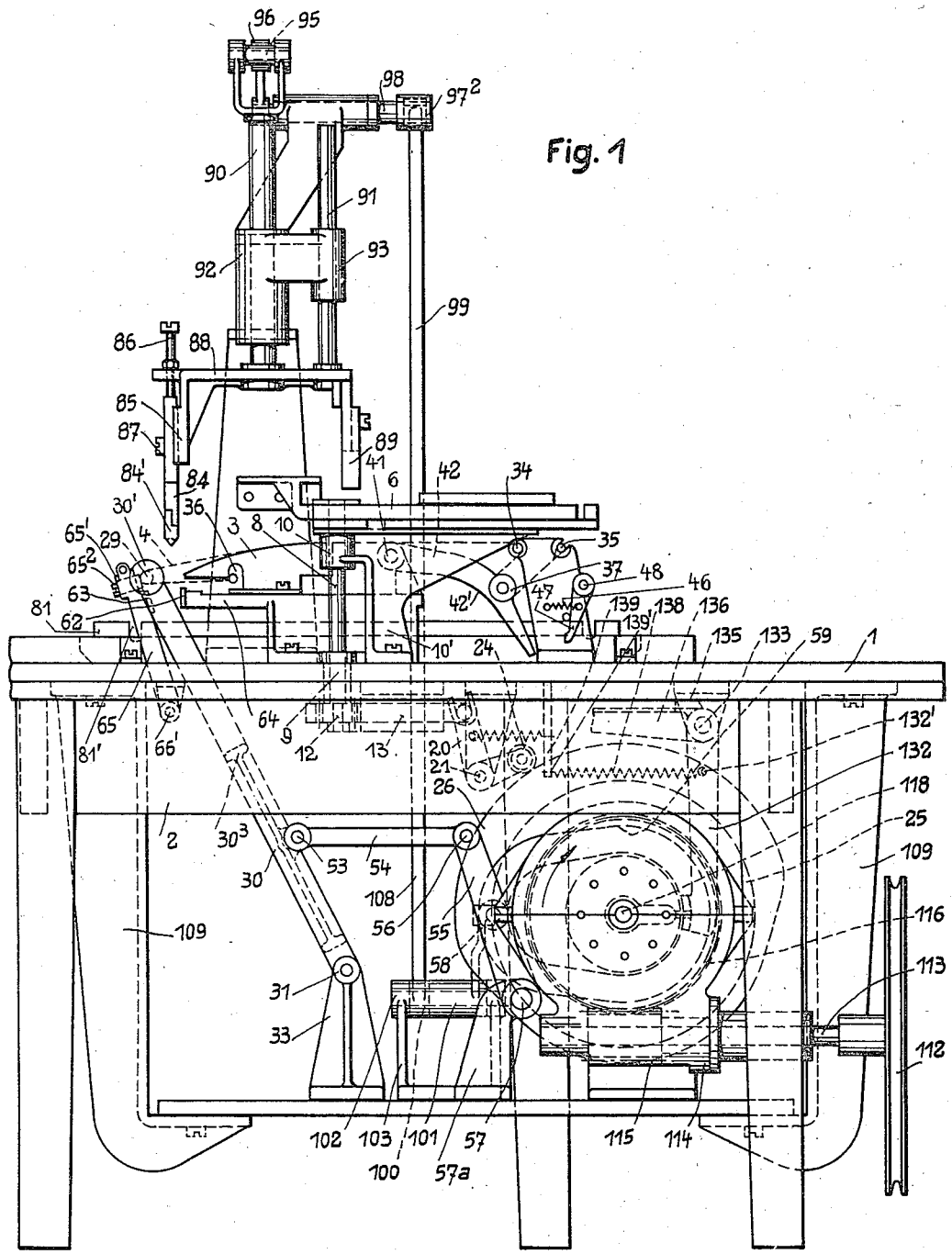

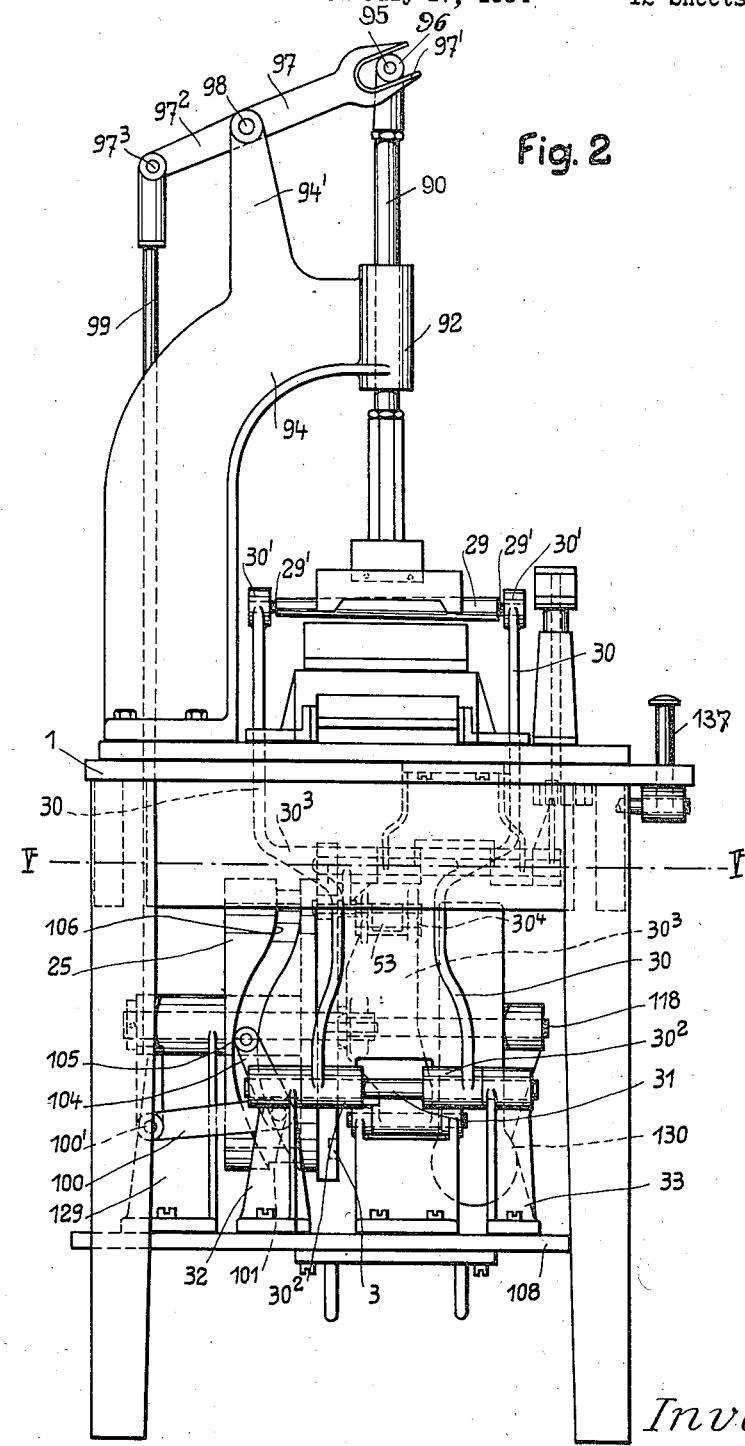

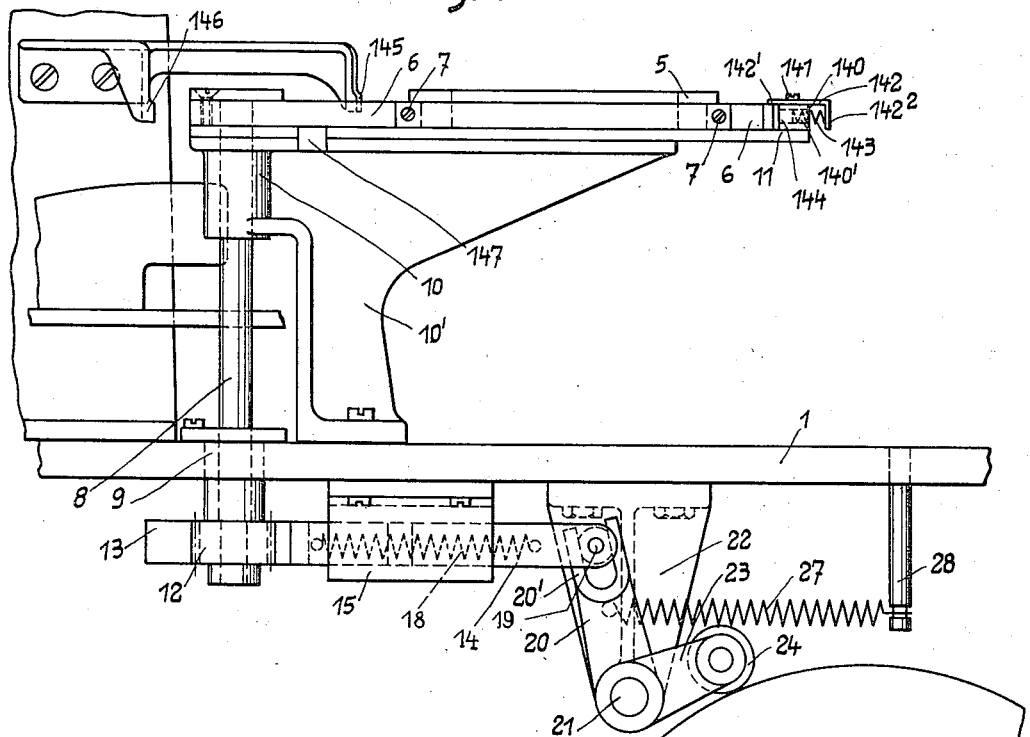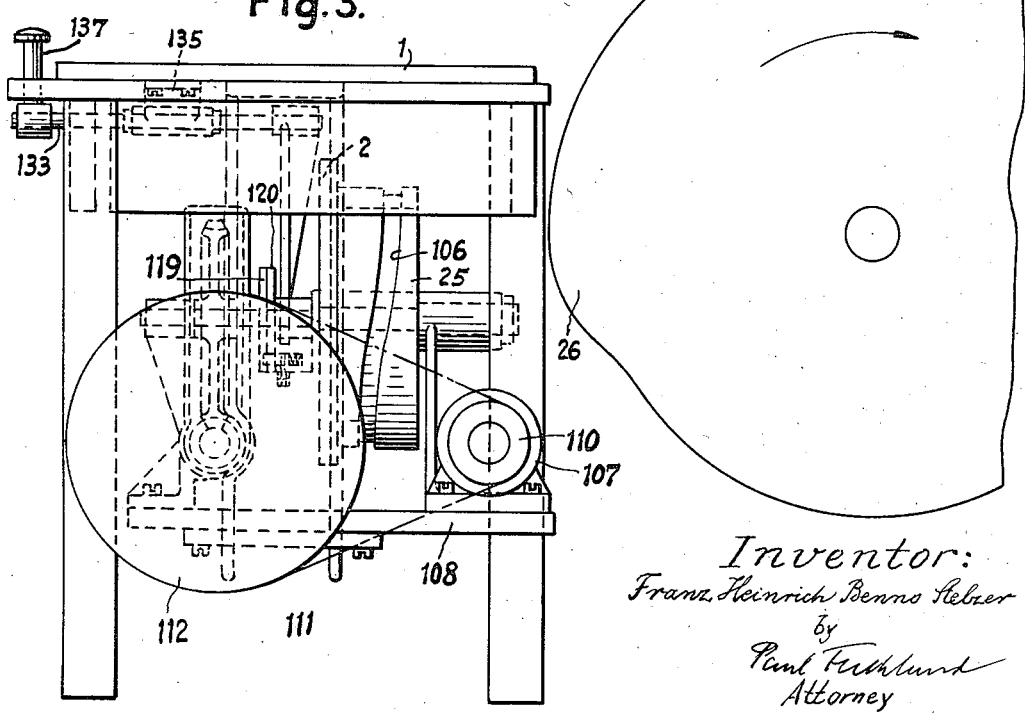

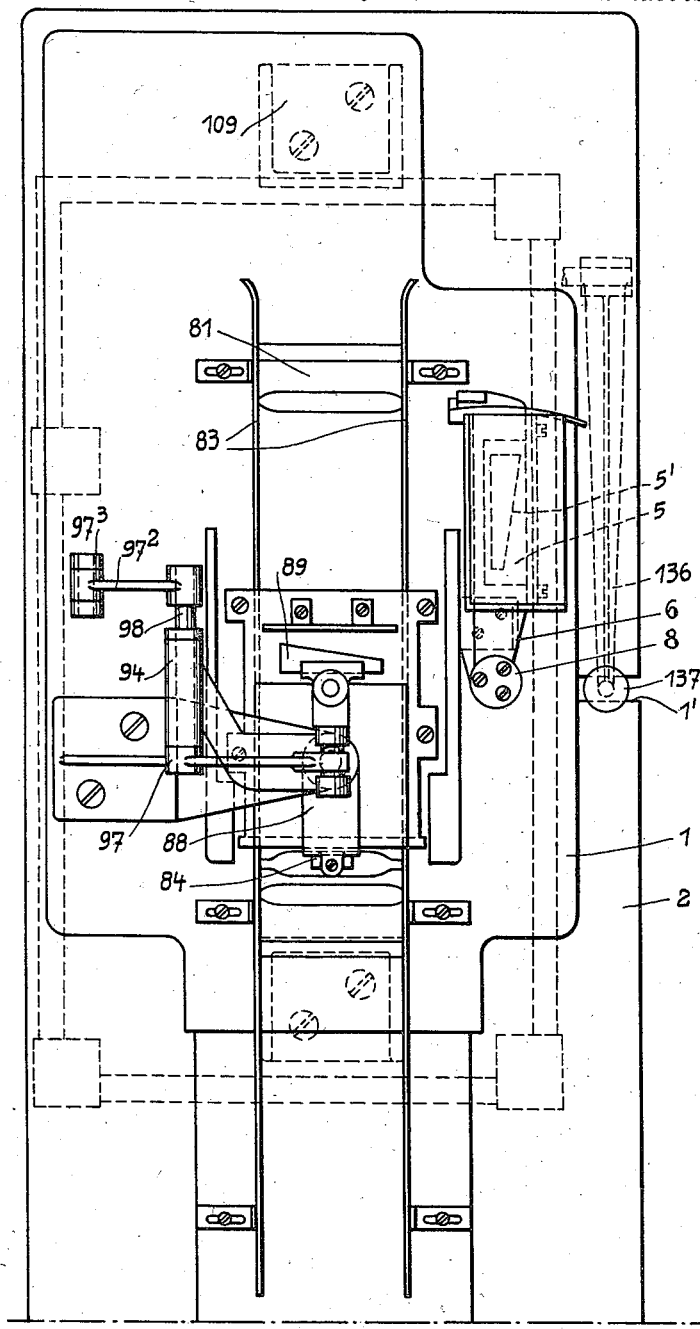

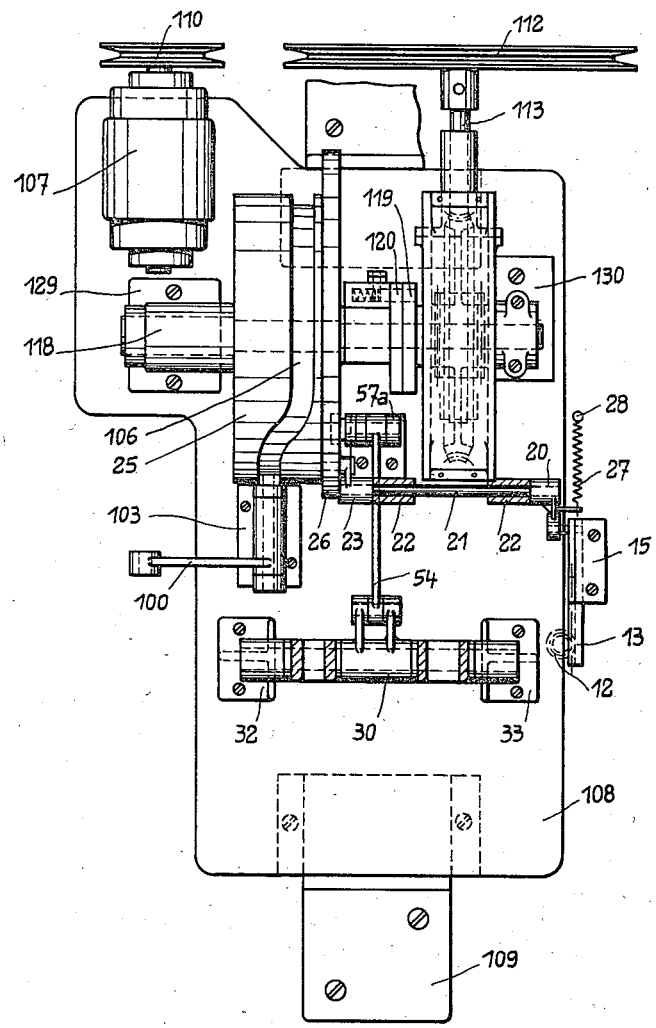

March 10, 1936. F. H. B. STELZER 2,033,310
MACHINE FOR MAKING CIGAR ROLLS
Filed July 17, 1934    12 Sheets-Sheet 7

Inventor:
Franz Heinrich Benno Stelzer
by
Paul Fuchland
Attorney

March 10, 1936.    F. H. B. STELZER    2,033,310
MACHINE FOR MAKING CIGAR ROLLS
Filed July 17, 1934    12 Sheets-Sheet 8

Inventor:
Franz Heinrich Benno Stelzer
by
Paul Fuchslund
Attorney

March 10, 1936. F. H. B. STELZER 2,033,310
MACHINE FOR MAKING CIGAR ROLLS
Filed July 17, 1934     12 Sheets-Sheet 9

Inventor:
Franz Heinrich Benno Stelzer
by
Paul Fuchlund
Attorney

March 10, 1936.  F. H. B. STELZER  2,033,310
MACHINE FOR MAKING CIGAR ROLLS
Filed July 17, 1934  12 Sheets-Sheet 10

Inventor:
Franz Heinrich Benno Stelzer
by
Paul Fickland
Attorney

March 10, 1936.  F. H. B. STELZER  2,033,310
MACHINE FOR MAKING CIGAR ROLLS
Filed July 17, 1934    12 Sheets-Sheet 11

Inventor:
Franz Heinrich Benno Stelzer
by
Paul Freshland
Attorney

March 10, 1936.  F. H. B. STELZER  2,033,310

MACHINE FOR MAKING CIGAR ROLLS

Filed July 17, 1934  12 Sheets-Sheet 12

Inventor:
Franz Heinrich Benno Stelzer
by Paul Fernhund
Attorney

Patented Mar. 10, 1936

2,033,310

UNITED STATES PATENT OFFICE 2,033,310

MACHINE FOR MAKING CIGAR ROLLS

Franz Heinrich Benno Stelzer, Dresden, Germany, assignor to the firm "Universelle" Cigarettenmaschinen-Fabrik J. C. Müller & Co., Dresden, Germany Application July 17, 1934, Serial No. 735,634
In Germany July 24, 1933

15 Claims. (Cl. 131—42)

This invention relates to machines for making cigar rolls, more especially to a machine of simple construction in which all devices imitating or replacing handwork are controlled by suitable levers all of which are actuated from a common cam-disk or drum in well-timed operation.

The machine according to the present invention effects the wrapping of the filler by means of the well-known rolling belt and rolling table, as well as the previous shaping of the filler, the setting of the finished roll in view of the well-known pressing mold and the introduction of this roll into one of the parallelly disposed chambers of the opened pressing mold, this pressing mold moreover being stepwise advanced after each charging of a pressing chamber.

According to the invention this object is realized by providing in the machine a lever by means of which the pre-shaped portion of filler is conveyed above the slack of the rolling belt, a second lever controlling the means for rolling the tobacco and opening, after the rolling operation is completed, a guide or device for holding the roll and finally a third lever transferring the filler kept in position into the slack and at the same time pressing the roll kept in the guide into the roll-pressing mold which is carried into the corresponding position by the lever controlling the rolling-belt. All the levers are controlled by one and the same cam-drum.

I am aware that some of the elements constituting the combination hereafter claimed have already been used separately in machines for making cigars. What I claim is the new combination of the lever-controlled mechanisms by which handwork is replaced in a most simple manner.

The invention is illustrated by way of example in the annexed drawings of which

Fig. 1 is a front elevation,

Fig. 2 is a side elevation seen from the left hand side of Fig. 1.

Fig. 3 is a partial side elevation seen from the right hand side of Fig. 1.

Fig. 4 is a plan view.

Fig. 5 is a horizontal cross-section taken along the line V—V of Fig. 2.

Fig. 6 shows a part of Fig. 1 on an enlarged scale.

Fig. 7 shows a part of Fig. 4 on an enlarged scale.

Figs. 8 and 9 show plan views of the parts illustrated in Fig. 6.

Figure 24:
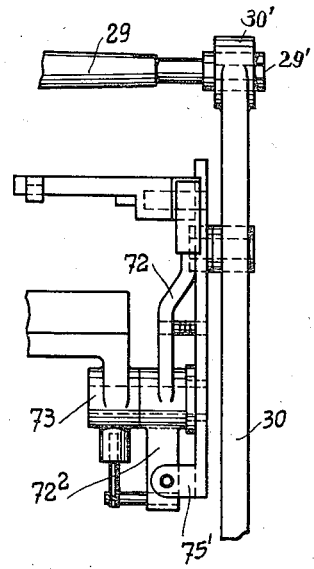

Fig. 24 a corresponding side elevation.

Figure 25:
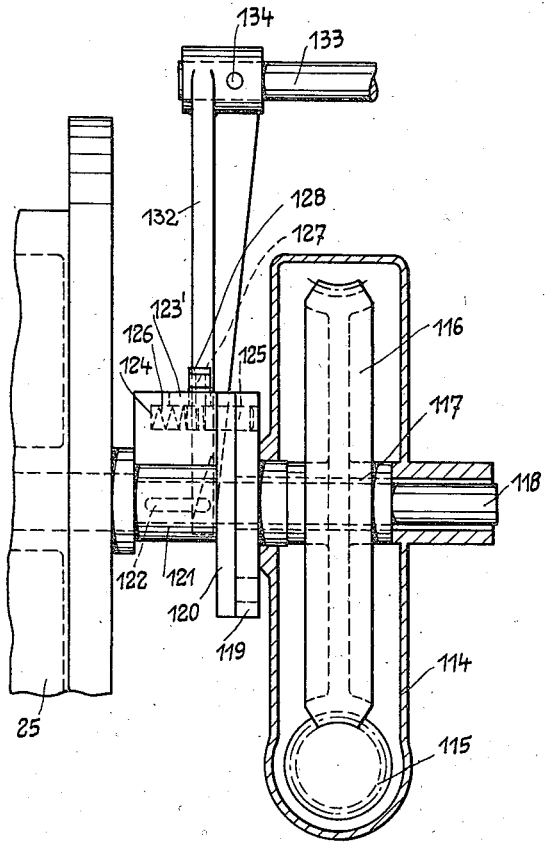

Fig. 25 shows a part of Fig. 2 on an enlarged scale, partially in vertical cross-section.

Figure 26:
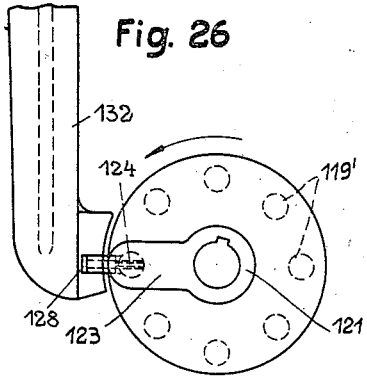

Fig. 26 is a corresponding side-elevation seen from the right hand side of Fig. 25.

Figure 27:
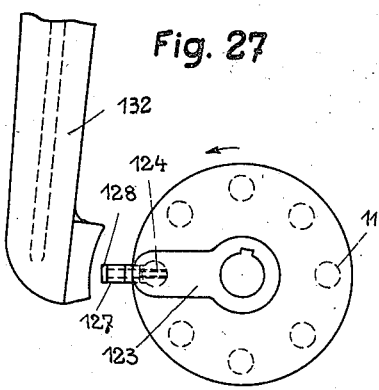

Fig. 27 shows the parts illustrated in Fig. 26 in another position, and

Figure 28:
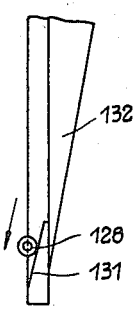

Fig. 28 is a detail view.

On the plate 1 supported by the frame 2 the rolling table 3 is provided on which the rolling belt 4 is placed. A cavity 3' is provided in the rolling table into which cavity the portion of tobacco to be rolled is pressed. This tobacco portion is measured by means of a molding-box 5 (Figs. 6, 7). This box, mainly consisting of a thick wooden board provided with a corresponding cavity 5', is secured by screws 7 to a swing lever 6 secured to the top end of the shaft 8 journaled at 9 and 10. The bearing box 9 is mounted in the plate 1, whereas the bearing 10 forms part of the bracket 10' mounted on the plate of the table. At the bottom end of the shaft 8 a small cog-wheel 12 is secured engaging a rack 13 (Figs. 8, 9). The latter slides with a prolongating bar 14 longitudinally in a guide 15 screwed from below to the plate 1, the rack 13 engaging with its projection 13' a recess 14' formed in the bar 14. A pin 16 is provided on the rack 13 and a pin 17 on the bar 14. These two pins are engaged by a spiral spring 18 which tends to bring the rack and its prolongation into the position shown in Fig. 8. By this connection of the rack 13 with the prolongation 14 no undesired play between the respective members arises even after the machine has been used for a long time. However, if a play occurs after some time between the cog wheel 12 and the teeth of the rack 14, no slip will result because the spring 18 always acts to maintain a contact between the engaged elements at one side at least.

The roll 19 mounted on the bar 14 is encompassed by the U-shaped end 20' of the lever 20 (Fig. 6). The lever 20 is secured on the shaft 21 journaled in the bracket 22. Furthermore on the shaft 21 a lever 23 is mounted the end of which bears the roll 24. A spring 27 fastened at 28 engages the arm 20. Under the action of the spring 27 the roll 24 is pressed against the cam 26 provided on the cam-drum 25.

The winding roller 29 coacting with the rolling belt 4 is journaled with its ends 29' in eyes 30' provided at the upper ends of two swing levers 30 (Figs. 13-16). The latter are secured by means of hubs 30² on a shaft 31 journaled in small bearing brackets 32 and 33 (Fig. 2).

Figure 10:
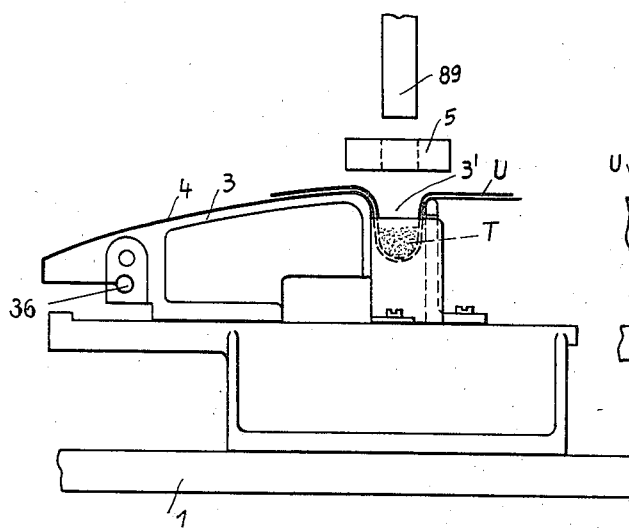
Fig. 10 shows the rolling-belt table on an enlarged scale.
Figure 12:
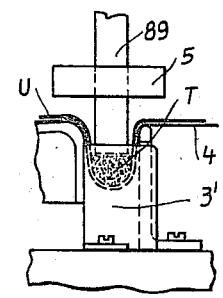
Fig. 12 is a side elevation showing an especial position.
Figure 11:
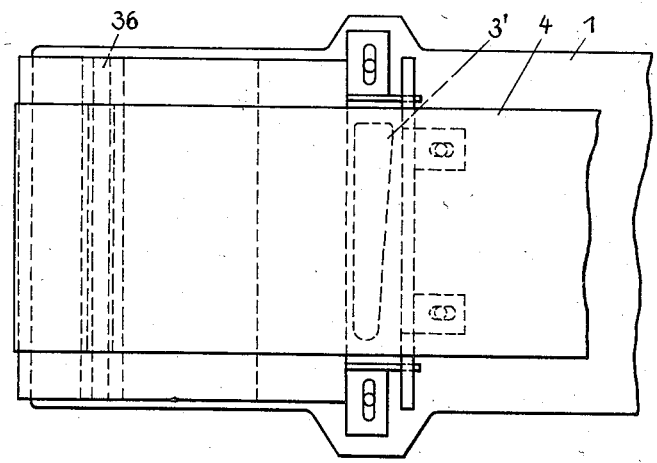
Fig. 11 is a plan view.
Figure 13:
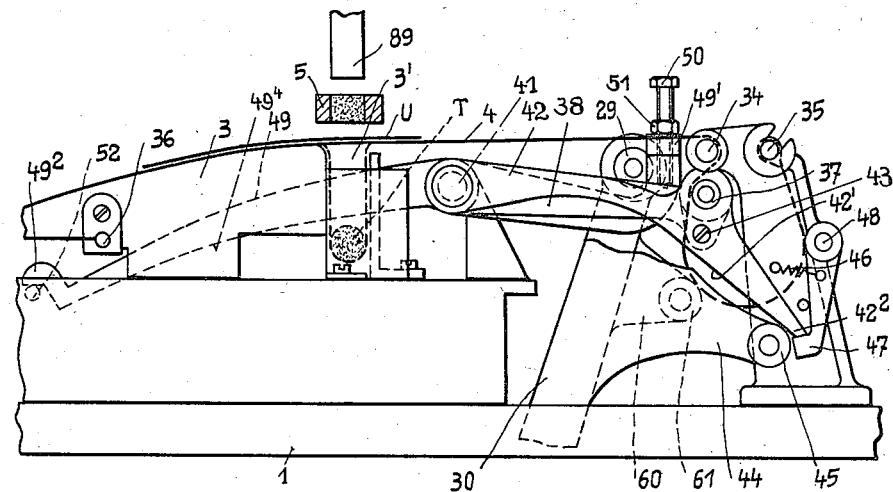
Fig. 13 shows a part of Fig. 1 on an enlarged scale.
Figure 14:
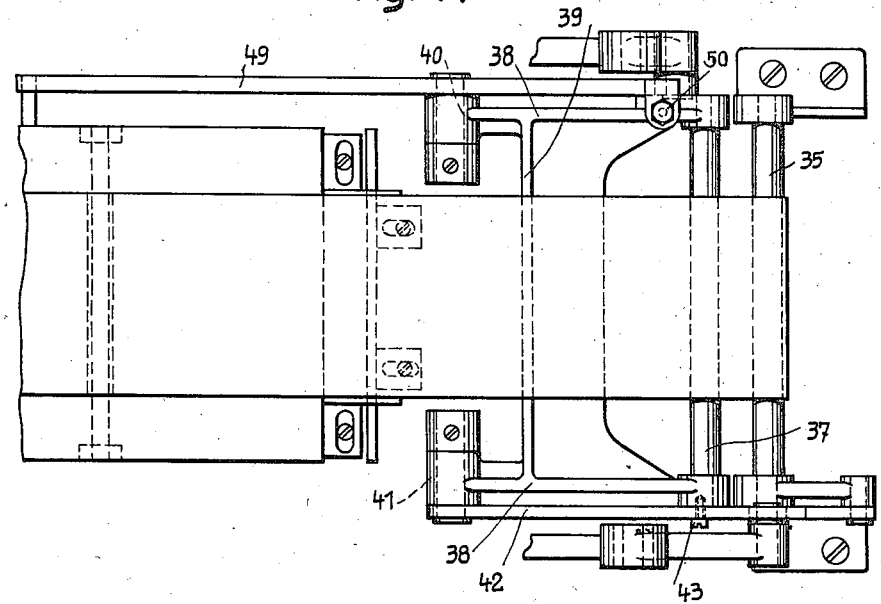
Fig. 14 is a corresponding plan view.
Figure 15:
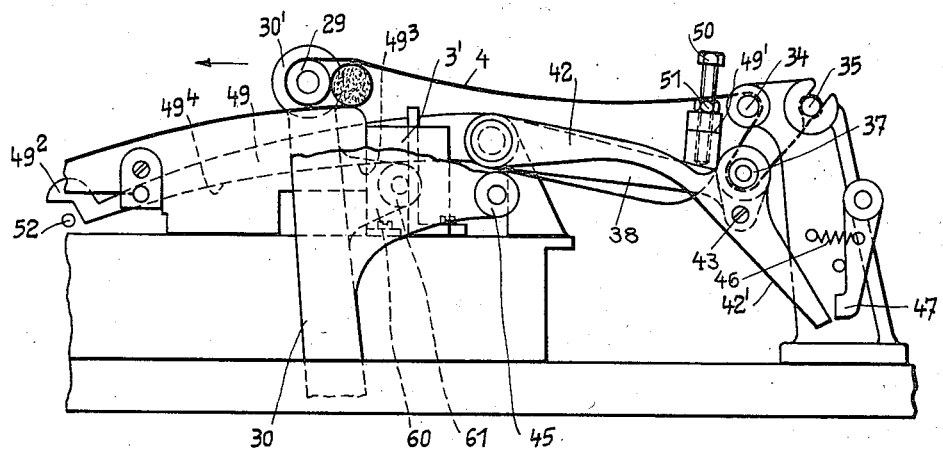
Figs. 15 and 16 are views showing different positions.
Figure 16:
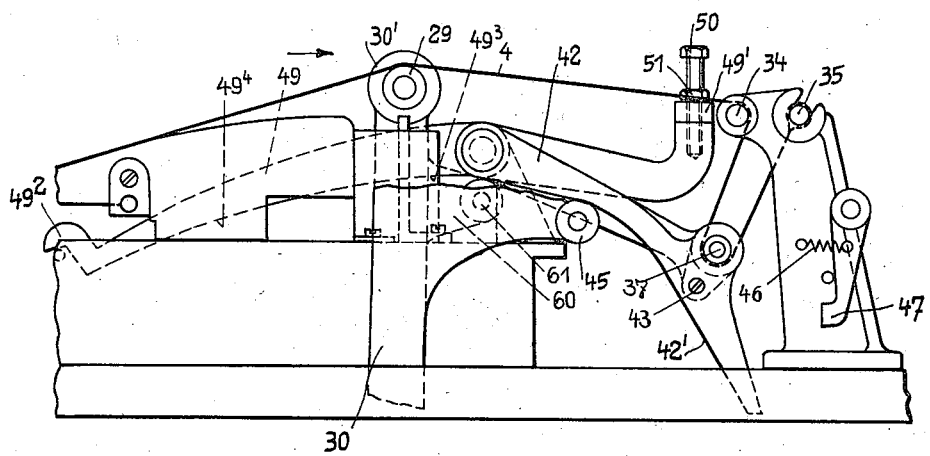

The rolling belt 4 is placed over the guiding roller 34 and secured at 35 and 36 (Fig. 13). A tension or tightening roller 37 journaled at the levers 38 (see especially Fig. 14) engages the slack or loop lying between the point of fixation 35 and the guiding roll 34. The levers 38 are connected by a bridge 39 and are supported by pivots 40 and 41 secured to the frame of the machine. The controller 42 connected by a screw 43 with a lever 38, is mounted on the pivot 41. The swing arm 42 is on its lower side at 42' shaped to form a curve (Figs. 13 and 15). The roll 45 provided on the projection 44 of one of the levers 30 coacts with the said curve 42'. The end 42² of the swing lever 42 coacts with a pawl 47 subjected to the tension of the spring 46 whereby this swing lever is kept in the position shown in Fig. 13. The pawl 47 is fulcrumed in the pivot 48 secured in the frame of the machine. Furthermore a two-armed lever 49 is mounted on the pivot 40 which lever carries at its one end 49' the set screw 50 with the counter-nut 51. The left-hand arm of the lever 49 is shaped on its lower side 49⁴ to form a curve. The end 49² of this arm engages in its idle position a pin 52 provided on the frame of the machine.

The swing levers 30 are connected by the pivot 53 engaged by the link 54 (Fig. 1). The latter encompasses the pivot 56 provided at the free end of the lever 55. The lever 55 is fulcrumed at 57 on the frame of the machine and engages with the roller 58 provided thereon the cam-groove 59 provided in the cam-drum 25.

The here described device operates as follows:

When the winding roller 29 is in the position shown in Fig. 13, the right hand end of the rolling belt 4 slacks as shown in the drawings forming a loop. Now the tobacco portion from which the roll is to be formed is pressed down into the cavity 3' of the rolling table.

Hereupon the swing levers 30 are swung by means of the cam drum 25 to the left hand in Fig. 13. As soon as in this way the winding roller 29 has attained the position shown in Fig. 15, the tobacco portion has been lifted from the cavity and is kept in the loop formed behind the winding roller 29. As the cavity 3' is made considerably deep to prevent the tobacco or the like from scattering out, an excess of rolling belt is present behind the loop so that the tobacco on the rolling table could not be duly formed to a roll (see Fig. 15). For this reason the rolling belt must be stretched or tightened by the tension roller 37 so as to keep the tobacco portion together by the loop formed in the prescribed manner as shown by full lines in Fig. 15. This is effected by the roller 61 provided on the projection 60 of the swing lever 30 which coacting with the cam portion 49³ of the swing lever 49 swings the latter into the position shown in Fig. 15. Hereby the lever 42 connected with the lever 38 is pressed against the action of the spring 46 out of the range of the link 47.

Hereby the tightening roller 37 has been carried down so that the rolling belt 4 has undergone a corresponding tension as shown in Fig. 15. Whilst hereupon the roller 61 is rolled along the cam portions 49⁴ substantially lying between the fulcrums of the levers 30 the tobacco portion is shaped to a roll by enveloping the same with the inside wrapper in the well known manner and is finally thrown out at the end of the rolling table.

While the winding roller 29 is returning (viz. moved to the right hand in the sense of Fig. 16) the roller 61 runs anew first along the cam portion 49⁴ and finally after having met the cam portion 49³ causes the lever 49 again to swing into its initial position, the end 49² engaging the pin 52. At the end of the right hand movement of the levers 30 or the winding roller 29 the roll 45 meets the cam portion 42' lifting the latter while tightening the rolling belt and finally placing it behind the rest of the swinging lever 47.

Figure 17:
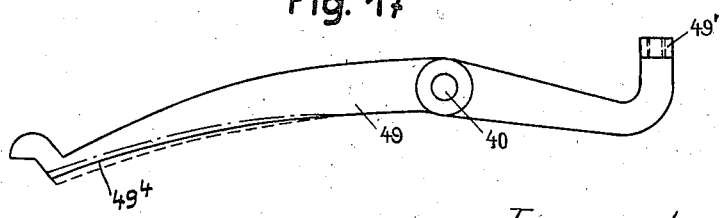
Fig. 17 is a detail view.

In the modification here described it is assumed that the cam portion is shaped concentric to the fulcrum of the swing levers 30. In this way the corresponding cam portion 49⁴ may be made to project more and more towards the end of the swing lever 49, as shown in Fig. 17 by dotted lines. In this case the tension of the rolling belt would be increased during the rolling operation by correspondingly swinging the lever 49. However the cam portion 49⁴ may also be shaped according to the dash-and-dot lines in Fig. 17. In this case the tension of the rolling belt would be decreased to a certain extent during the rolling operation. Whether the tension during the rolling operation is to be increased or decreased depends upon the quality of the tobacco and the form of the roll used. In any case the present invention affords the possibility to adapt the cam portion 49⁴ to different conditions.

Figure 18:
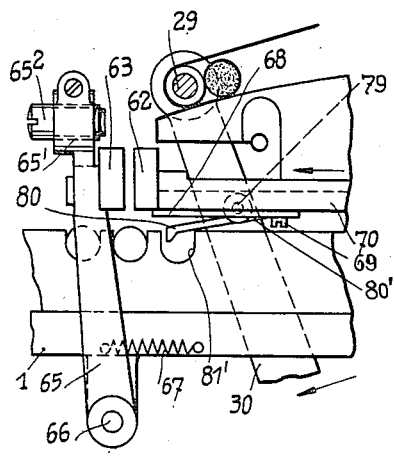
Fig. 18 shows another part of Fig. 1 on an enlarged scale.
Figure 19:
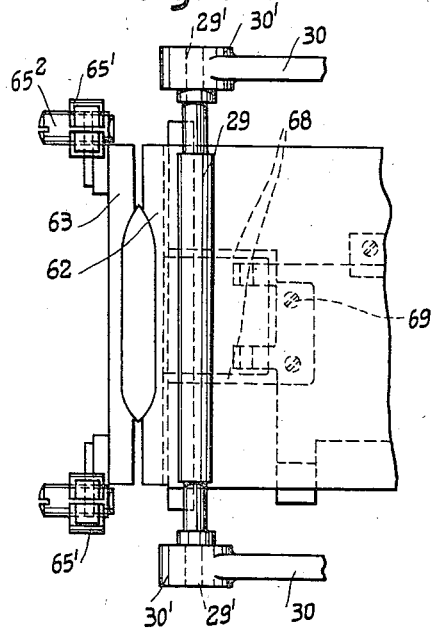
Fig. 19 is a corresponding plan view.
Figure 21:
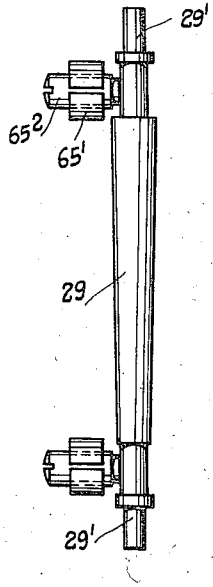
Fig. 21 shows a detail thereof.

A pair of jaws 62 and 63 is provided beneath the left hand end of the rolling table 3, the jaws being shaped according to the shape of the roll (see especially Fig. 19). Whereas the jaw 62 is rigidly secured to the frame by an arm 64, the jaw 63 is fixed to the upper ends of two swing levers 65 mounted on the shaft 66 (Fig. 18). The latter is journaled in a small bracket which is secured to the plate 1 of the table. Upwardly projecting members 65' shaped to form abutments 65² are provided on the levers 65. The two ends of the winding roller 29 meet these abutments after the roller has nearly reached its left hand end position (with reference to Fig. 1). Thereby the levers 65 are swung against the tension of two springs 67 engaging them in such a manner that the jaw 63 is moved apart from the jaw 62 and the roll falling out of the rolling belt may easily drop into the space between the jaws.

Figure 20:
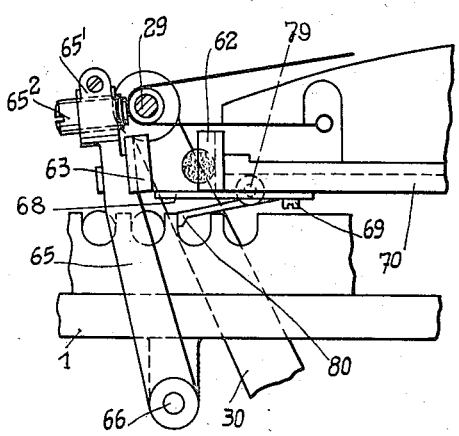
Fig. 20 shows the parts illustrated in Fig. 18 in another working position.

Beneath the jaws a bifurcated fork 68 is provided which when the roll drops from above between the jaws 62 and 63 is in the position shown in Fig. 20 and thereby prevents the roll from falling from between the jaws. This fork 68 is secured by means of screws 69 on a carriage longitudinally slidable below the rolling table 3.

Figure 22:
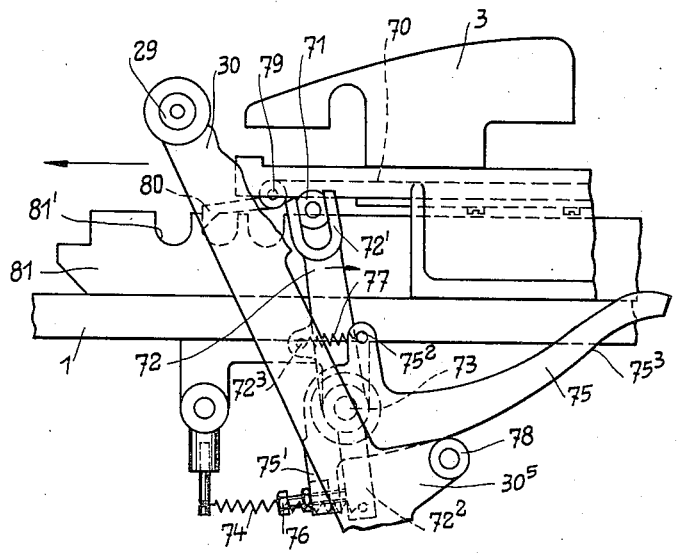
Fig. 22 shows still another part of Fig. 1 on an enlarged scale.
Figure 23:
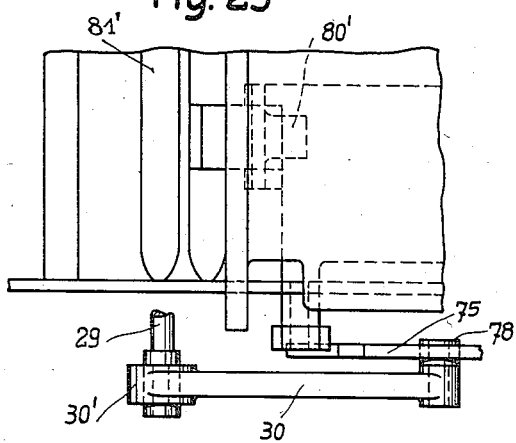
Fig. 23 is a corresponding plan view.

In the carriage 70 the block 71 is rotatably mounted which is engaged by the bifurcated end 72' of the lever 72. The lever 72 may be swung on the shaft 73 which is supported by a small bracket secured to the table 1. A spring 74 engaging the free end 72² tends to swing the lever 72 in the direction of the arrow (Fig. 22). A freely rotatable lever 75 is provided on the shaft 73 carrying a projecting arm 75'. In the arm 75' a set screw is provided serving as an abutment and projecting into the range of the arm 72². A spring 77 engaging the lever 75 at 75² and the lever 72 at 72³ tends to move the two levers 72 and 75 against one another in such a manner that the set screw 76 comes into contact with the arm 72². A projecting member 30⁵ is provided on one of the swinging levers 30 carrying the roll 78. The latter projects into the plane in which the lever 75 is swung.

A pawl 80 is linked to the carriage 70 by means of the pin 79, this pawl carrying at its rear side a prolongation contacting the carriage 70, whereby the downward movement of the pawl 80 is limited (Fig. 18).

When the swing levers 30 carrying the winding roller 29 are in their right-hand position in view of Fig. 1 the carriage 70 is in the position shown in Fig. 18. Now when the swing levers 30 are swung to the left hand side in the sense of Fig. 1, the roll 78 meets the lever 75 before the swing levers 30 reach their left hand end position and the lever 75 is swung into the position shown in Fig. 22 carrying with itself the lever 72. Hereby the carriage 70 is moved from the position shown in Fig. 18 into the position shown in Fig. 22, the pawl engaging the pressing chambers 81' of the pressing molds 81 advancing the pressing molds 81 guided beneath the rolling table 3 between guiding racks 83 by one step, that is to say the pressing molds 81 are advanced by one section of the pressing chamber 81' in the direction of the arrow shown in Fig. 22, so that the next empty pressing chamber takes the position beneath the channel formed by the jaws 62 and 63. At the same time the fork 68 secured to the carriage has been displaced so that its prongs are beneath the jaws 62 and 63 and receive the roll dropping from the rolling belt.

Now when the swing levers 30 carrying the winding roller 29 are anew swung backwards to the right hand side, the roll 78 again releases the lever 75 so that the latter may swing downwards under the action of the spring 74. Hereby the upwardly projecting abutments 65' of the levers 65 are released, the jaws 62, 63 are closed, and at the same time the fork 68 is again withdrawn with the pawl 80 into the position shown in Fig. 18. The roll is now kept exactly above the empty pressing chamber 81', the jaws 62, 63 being slightly compressed.

The roll is projected by the piston 84 out of the channel formed between the jaws 62, 63 into the pressing chamber thereunder (Fig. 1). The lower end 84' of the piston 84 is shaped in accordance with the form of the tobacco roll. In order to permit of the manufacture of cigars of different size by this machine, the lower part 84' of the piston is made exchangeable. The piston 84 is shaped to form a slider slidable and fixable in a guide 85, the screw 86 serving for adjusting and the screw 87 for fixing. The guide 85 is provided on a cross-member 88 carrying the piston 89 for projecting the tobacco portion from the molding-box 5 into the pressing-cavity 3'. This piston is likewise made exchangeable according to the exchangeability of the molding-boxes 5. The cross-member 88 is provided with two upwardly projecting guide bars 90 and 91 which can be vertically shifted sockets 92 and 93. The sockets are formed on a frame-arm 94 mounted on the plate 1. The upper end of the bar 90 is bifurcated and carries the pivot 95. The roller 96 supported by the pivot 95 is encompassed by the bifurcated end of the lever 97 which is secured to the shaft 98. The latter is journaled in an upwardly projecting part 94' of the frame arm 94 and carries at its other end the lever 97². The free end of the lever 97² is engaged at 97³ by the governing rod 99, the lower end of which is connected by the pivot 100' with a lever 100. The hub 101 of the lever 100 is journaled on the shaft 102 carried by a bearing bracket 103. To the hub 101 a lever 104 is secured engaging with its roller 105 the cam groove of the cam drum 25.

The drive of the machine is effected by an electro-motor 107 mounted on a plate 108 arranged under the plate 1 of the table (Fig. 3). The plate 108 is supported by arms 109 secured to the lower side of the plate 1. A cord 111 is led over the pulley 110 of the electromotor and runs over the pulley 112. The latter is mounted on a shaft 113 journaled in a casing 114 and carrying the worm 115. The latter engages the worm wheel 116 mounted on the box 117 (see also Fig. 25). The box 117 is freely journaled on the shaft 118 and carries at its left hand end the disk 119 which is provided with a circular row of bores 119' concentrically arranged around the shaft 118. A disk 120 is adjointed to the disk 119, the hub 121 being non-rotatably connected with the shaft 118 by a feather or key 122. From the hub 121 projects a member 123 in which a bore 124 is provided penetrating also the disk 120. Into this bore the lost motion bolt 125 is inserted which is pressed to the right hand in the sense of Fig. 25 under the action of a press spring 126. Into the lost motion bolt 125 a pin 127 is screwed which projects through a recess 123' provided in the member 123. A roller 128 is mounted on the end of the pin 127.

When the bolt 125 takes the position shown in Fig. 25, its front end engages one of the bores 119' so as to couple the two disks 119 and 120 and therewith the worm wheel 116 with the shaft 118. The latter supported by bearing brackets 129 and 130 secured on the plate 108 is secured to the cam cylinder 25.

When the motor 107 is running the shaft 118 is turned, with the cam drum 25 mounted thereon, in the direction of the arrow shown in Fig. 1. As soon as the roller 128 comes into the range of the sloping surface 131, the roller 128 rises on the sloping surface 131 as shown in Fig. 28. Hereby the bolt 125 is moved to the left hand side in the sense of Fig. 25. Thus the end of the bolt 125 projecting into the field of the disk 119 is withdrawn so that the two disks 119, 120 are discoupled. Therefore the disk 119 continues to turn with the worm wheel 116, whereas the disk 120 with the shaft 118 in the cam cylinder 25 stops.

The sloping surface 131 is disposed at the free end of the lever 132 which is secured on the shaft 133 by a pin 134. On the shaft 133 which is carried by a bearing bracket 135 arranged beneath the plate 1 of the table the lever 136 is secured carrying at its free end the presser button 137 upwardly projecting through a hole 1' in the plate 1. A spring 138 engaging the lever 132 at 132' tends to keep the lever 132 in the position shown in Fig. 1. The spring 138 is suspended at 139' on the pin 139 secured to the table 1.

To prevent the bottom 11 of the molding box 5 when swinging around the shaft 8 from being pressed down on introducing the tobacco a small block 140 is secured to the free end of the bottom plate 11, and the plate 142 is screwed by means of the screws 141 on the said block (Figs. 6, 7). The plate 142 overlaps with its end 142' the end of the swing arm 6 as shown in full lines in Fig. 7 and in the manner shown in Fig. 6. In this means the plate 11 is absolutely prevented from being pressed down from the swing arm 6 when introducing the tobacco. The block 140 is provided with the bore 140 into which a bolt 144 being exposed to the action of the press spring 143 is inserted. The end 142² of the plate 142 is bent down at a right angle and the spring 143 rests on it. On the other hand the bolt 144 is pressed against the edge 6' bent to a circular arch of the swing arm 6 whereby a frictional connection between the bottom plate 11 and the swing arm 6 is effected. As shown in Fig. 7 the arc shaped edge 6' is continued on a projecting member 6² of the swing arm.

The device operates as follows:

After the operator has duly filled with tobacco the cavity 5' of the molding box 5 i. e. after he has introduced so much tobacco into the cavity 5' that after slight pressing down the cavity is filled with tobacco as uniformly as possible, and after the operator has placed an inside wrapper U on the rolling belt as shown in Fig. 13, he may start the machine by pressing down the button 137. Hereby the levers 132 and 136 are swung against the action of the spring 138 in such a manner that the sloping surface 131 is pressed out of the scope of the roll 128 as shown in Fig. 27. Now the bolt 125 under the action of the spring 126 may catch a just passing bore 119' so that the worm wheel 116 which is continuously rotated by the electromotor is coupled with the shaft 118 and thereby with the cam drum 25. Therefore the latter is set in motion in the direction of the arrow shown in Fig. 1. Hereby first the linkage 20, 23 is swung under the action of the spring 27 in such a way that the shaft 8 is turned and the swing arm 6 carrying the molding box 5 passes from the position shown in full lines in Fig. 7 the position shown in dotted lines in Fig. 7.

During this swinging operation the utmost end of the bottom plate 11 provided with the small block 140 meets the abutment 145 provided on the frame of the machine. By this abutment the bottom plate is retained in the position shown in dotted lines in Fig. 7, whereas the swing arm carrying the molding box 5 takes its end position in which the swing arm with the projecting lug 6³ touches the abutment 146. In order to attain in any case that the swing arm surely arrives in this end position, i. e. the cavity 5' of the molding box exactly takes the position above the cavity 3' of the rolling table the cam 26 is so shaped that the levers 20, 23 are moved somewhat farther than necessary, the required expansion of the linkage being effected by the two parts 13, 14 moving a small distance towards one another against the action of the spring 19 of Fig. 9. By retaining the bottom plate 11 in the position shown in Fig. 7 in dotted lines the cavity 5' is open in the downward direction and now the piston 89 may be put into action. This is effected from the lifting curve 106 which causes the rod 99 to go upwards and to carry the cross-member 88 downwards. Thereby the tobacco portion T pressed into the cavity 5' is pressed into the cavity 3' of the rolling table taking with it the rolling belt 4 and the inside wrapper U. It may be noted that this is effected whilst the rolling belt is completely released (see the lifted position of the tightening roller 37 and the free slack of the rolling belt forming a loop in Fig. 13).

Now the swing arms 30 which during these operations took the position shown in Fig. 13 are swung from the left hand up to the position shown in Fig. 1. An intermediate position is shown in Fig. 15. Here the tobacco portion T has just been lifted from the cavity 3' and is located in the loop formed behind the winding roller 29. Now while the latter moves forward to the left hand in the sense of Fig. 15 the tightening roller 37 is actuated by the above described means. When the swing arms 30 and the winding roller 29 have approximately reached the position shown in Fig. 18 the roll 78 strikes the lower curve-shaped side 75³ of the lever 75 the latter being swung against the action of the spring 74 while the swing arms 30 go farther to the left hand. Hereby the carriage 70 is displaced in the direction of the arrow shown in Fig. 18. This however results in the pawl 80, engaging the empty pressing chamber 81', displacing the pressing mold 81 in such a manner that the said pressing chamber takes a position under the channel formed between the jaws 62 and 63. Shortly before the motion of the swing levers 30 in the direction of the arrow shown in Fig. 20 is completed, the ends of the winding roller 29 meet the upwardly projecting abutments 65' whereby the levers 65 are swung up to a position shown in Fig. 20. Hereby the jaw 63 is removed from the jaw 62 so that the tobacco portion T and the inside wrapper U forming together the roll W when projected from the rolling belt may freely fall between the jaws where it is first retained by the prongs of the fork 68.

On swinging backwards the levers 30 to the right hand in the sense of Fig. 1 first the abutments 65' are released again by the winding roller 29 so that the lever 65 under the action of the spring 67 may anew advance the jaw 63 toward the jaw 62 and now the roll W is kept clamped between the two jaws. At the same time also the carriage 70 is again carried back into the position shown in Fig. 18 so that the prongs 68 cease to obstruct the channel formed between the jaws 62 and 63.

During the operations just described the swing arm 6 has been swung back into position shown in full lines in Fig. 7. Hereby, before the swing arm has reached its initial position the bottom plate 11 strikes an abutment 147 provided on the bearing bracket 10' so that the bottom plate 11 again closes the cavity 5'.

As soon as the cam drum 25 has made a full turn and therefore the controlling elements deriving from it have once fulfilled their respective operations, the roll 128 again strikes the sloping surface 131 whereby the disks 119, 120 are discoupled and therewith the cam drum 25 is stopped. In the meantime the operator has again filled with tobacco the cavity 5' of the molding box and placed a new inside wrapper on the rolling belt. However the machine cannot be started again before the operator actuates the button 137 whereby at the same time it is warranted that an operator cannot by mistake come into contact with moving elements of the machine.

I claim:—

1. A machine in accordance with claim 10 in which the lever conveying the filter over the cavity in the table is shaped to form a swing arm carrying an exchangeable molding box for receiving the filler, the bottom of the said box being journaled to the said lever and frictionally connected therewith, and an abutment retaining the said bottom before the swing arm reaches its end position, whereas another abutment replaces the bottom when the swing arm is returned to its initial position.

2. In a machine for making cigar rolls comprising a rolling-table having a cavity and provided with a rolling belt the combination of a roller for tighening the belt, a roll-pressing mold, a lever adapted to convey a preliminarily shaped filler of tobacco over the said cavity, a lever controlling means for making the tobacco roll and opening, after the completion of the rolling operation, a channel for guiding the roll, means adapted to convey the filler kept in position over the said cavity into the latter and to convey the roll kept in the said guiding channel into the said roll-pressing mold, means for stepwise advancing the latter connected with the lever controlling the means for making the tobacco roll, a cam drum effecting the movement of the said levers and controlling means, levers carrying a winding roller and an abutment engaging a governing cam on a rotatably mounted governing member adapted to displace the tightening roll and thereby to tighten the rolling belt, and swing levers carrying the tightening roll connected with a second governing lever coacting with a pawl whereby said governing lever is held fast by the pawl in its lifted position corresponding to the release of the rolling belt until the tightening roll is brought into its operative position by the said first governing lever which releases the pawl, the second governing lever and a roll, provided on the levers carrying the winding roller, coacting with the said first governing member.

3. In a machine for making cigar rolls comprising a rolling-table having a cavity and provided with a rolling belt the combination of a roller for tightening the belt, a roll-pressing mold, a lever adapted to convey a preliminarily shaped filler of tobacco over the said cavity, a lever controlling means for making the tobacco roll and opening, after the completion of the rolling operation, a channel for guiding the roll, means adapted to convey the filler kept in position over the said excavation into the latter and to convey the roll kept in the said guiding channel into the said roll-pressing mold, means for stepwise advancing the latter connected with the lever controlling the means for making the tobacco roll, a cam drum effecting the movement of the said levers and controlling means, levers carrying a winding roller and an abutment, and a rotatably mounted governing member having a cam, said abutment engaging said cam to displace the tightening roll and thereby to tighten the rolling belt, the said governing cam being continued by a cam which permits varying the tension of the belt during the rolling operation.

4. In a machine in accordance with claim 10, said channel comprising a pair of jaws of which one is resiliently mounted and the other stationary, a lever carrying the movable jaw, and a winding roller carried by the ends of the said levers controlling the means for making the tobacco roll and adapted to meet with its ends the said lever.

5. In a machine in accordance with claim 10, said channel comprising a pair of jaws of which one is resiliently mounted and the other stationary, a lever carrying the movable jaw and two adjustable abutments, and a winding roller carried by the ends of the said levers controlling the means for making the tobacco roll and adapted to meet with its ends the said abutments.

6. In a machine in accordance with claim 10, means for interrupting the drive after one revolution of the said cam drum.

7. In a machine in accordance with claim 10, a mechanism adapted to drive the said cam drum, a coupling between the said driving mechanism and the cam drum, and means for disconnecting the coupling after one full revolution of the cam drum.

8. In a machine in accordance with claim 10, a mechanism adapted to drive the said cam drum, a releasable coupling between the said driving mechanism and the cam drum comprising two concentrically journaled disks of which one is connected with the driving mechanism and the other with the cam drum, a spring-actuated bolt in the second disk disposed in front of a circular row of bores in the first-named disk, a sloping surface disposed s oas to withdraw the bolt out of the first-named disk and capable of being removed by hand, and an abutment projecting from the said bolt adapted to coact with the said sloping surface.

9. In a machine in accordance with claim 10, a mechanism adapted to drive the said cam drum, a releasable coupling between the said driving mechanism and the cam drum comprising two concentrically journaled disks of which one is connected with the driving mechanism and the other with the cam drum, a spring-actuated bolt in the second disk disposed in front of a circular row of bores in the first-named disk, a sloping surface disposed on a swing lever connected with a linkage ending into a presser button, and an abutment projecting from the said bolt adapted to coact with the said sloping surface.

10. In a machine for making cigar rolls comprising a rolling-table having a cavity and provided with a rolling belt, the combination of a roll-pressing mold, a lever adapted to convey a preliminarily shaped filler of tobacco over the said cavity, a channel for guiding the roll, means for making the tobacco roll, a pair of levers controlling said means and opening, after the completion of the rolling operation, the said channel, a plunger adapted to convey the filler kept in position over the said cavity into the latter, another plunger adapted to convey the roll kept in the said guiding channel into the said pressing mold, a lever simultaneously actuating both plungers, means for stepwise advancing the pressing mold connected with the levers controlling the means for making the tobacco roll, and a cam drum effecting the movement of the said levers and controlling means.

11. A machine in accordance with claim 10 in which the levers controlling the means for making the tobacco roll are provided with a winding roll and an abutment, a rotatably mounted member provided with a cam, and tightening roll for said rolling belt, said abutment being adapted to engage said cam to displace said tightening roll thereby tightening said rolling belt.

12. A machine in accordance with claim 10, in which the levers controlling the means for making the tobacco roll are provided with an abutment, a rotatably mounted member provided with a cam, and tightening roll for said rolling belt, said abutment being adapted to engage said cam to displace said tightening roll thereby tightening said rolling belt, the said governing cam being continued by a cam which permits of varying the tension of the belt during the rolling operation.

13. A machine in accordance with claim 10, in which the levers controlling the means for making the tobacco roll are provided with an abutment, a rotatably mounted governing member provided with a cam, said abutment being adapted to engage said cam, swing levers carrying a tightening roll, and an adjustable abutment on the said governing member coacting with the said levers carrying the tightening roll.

14. A machine in accordance with claim 10, in which the means for making the tobacco roll comprise a pair of jaws of which one is resiliently mounted and the other stationary, both forming a guide for the tobacco roll at the end of the rolling table, a carriage and a fork secured to the latter, the levers controlling the means for making the tobacco roll being adapted upon their forward movement to remove one of the said jaws from the other and to simultaneously displace the carriage in such a manner that the prongs of the fork come into alignment with the said guide and catch the tobacco roll projected out of the rolling belt, and on return movement of said lever the guide is closed and the fork is withdrawn from the jaws.

15. A machine in accordance with claim 10, in which the means for making the tobacco roll comprise a pair of jaws of which one is resiliently mounted and the other stationary, both forming a guide for the tobacco roll at the end of the rolling table, a carriage, a fork secured thereto, the levers controlling the means for making the tobacco roll being adapted upon their forward movement to remove one of the said jaws from the other and to simultaneously displace the carriage in such a manner that the prongs of the fork come into alignment with the said guide and catch the tobacco roll projected out of the rolling belt, and on return movement of said levers the guide is closed and the fork is withdrawn from the jaws, said roll-pressing mold being provided with a row of pressing molds arranged beneath the rolling table between guiding bars, and a lost-motion link secured to the said carriage engaging the said molds.

FRANZ HEINRICH BENNO STELZER.